March 4, 1930.  R. GIBBONS  1,749,338
WIND SCREEN FOR AIRPLANE PLATFORMS
Filed Aug. 13, 1927
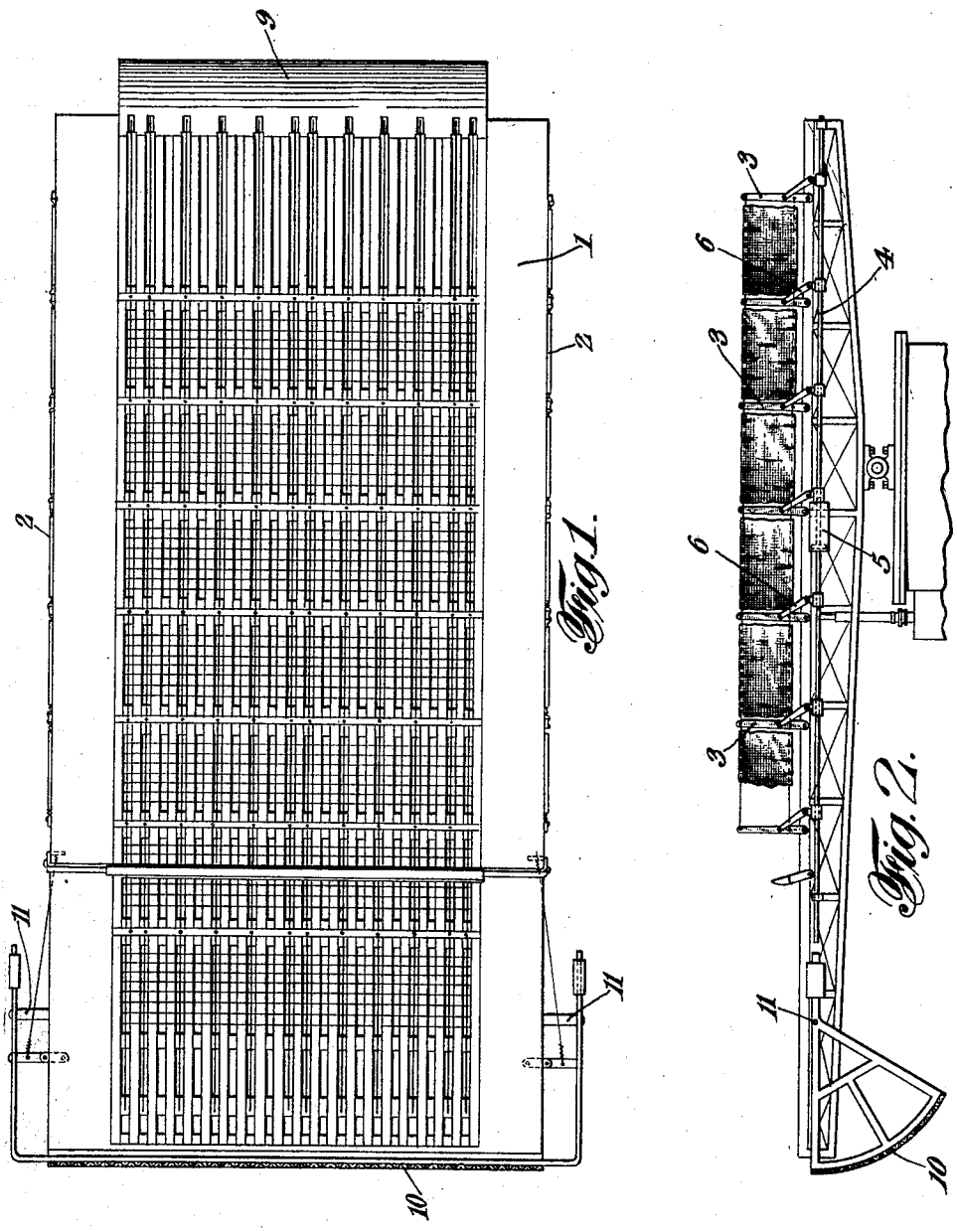
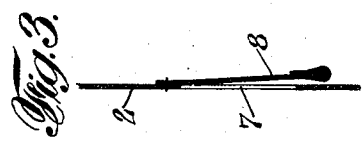
Inventor
Richard Gibbons
By his Attorneys Patented Mar. 4, 1930

1,749,338

UNITED STATES PATENT OFFICE

RICHARD GIBBONS, OF BROOKLYN, NEW YORK, ASSIGNOR TO MARY A. KENNEY, OF BROOKLYN, NEW YORK

WIND SCREEN FOR AIRPLANE PLATFORMS

Application filed August 13, 1927. Serial No. 212,669.

The invention aims to provide a wind screen or shield suitable for use in landing, launching or storage platforms for airplanes or dirigibles, for example, such as platforms which may be provided in connection with ships, floats, buildings, fortifications, etc.

Other objects and advantages of the invention will be in part obvious and in part specifically referred to in the description hereinafter contained which, taken in conjunction with the accompanying drawings, discloses a preferred embodiment thereof. Such embodiment, however, is to be considered as merely illustrative of its principles.

In the drawings—

Fig. 1 is a plan view of a landing and launching apparatus provided with a wind screen constructed in accordance with the invention.

Fig. 2 is an enlarged side elevation of a part of the apparatus shown in Fig. 1.

Fig. 3 is a detailed cross sectional view taken through the wind screen.

The invention is illustrated as applied to a landing and launching apparatus of the type shown in a previous United States patent to Gibbons No. 1,560,775, dated November 10, 1925, having a platform 1 providing a runway, but as the specific construction of the platform for the most part is not material to the present invention it will not be described in detail herein.

In accordance with the present invention, I provide a suitable number of wind screens 2 which may be positioned either to shield the space above platform 1 or to leave this space clear. The illustrated type of platform is of the type adapted to be turned in various directions according to the direction of the wind and is shown as having screens 2 extending along each of its opposite sides but it will be understood that a greater or smaller number of screens may be employed as desired.

As shown, each of the screens 2 is carried by a plurality of posts 3 pivoted near their bottom ends to the platform and having mechanisms associated therewith for positioning them in an upper position in which the screen 2 shields the space above the platform and an alternative lower position in which the screen 2 is moved down out of the way so as to leave clear the space above the platform. The particular mechanism illustrated as serving the above purpose, comprises a reciprocating shaft 4 passing through a compressed fluid cylinder 5, the shaft being connected to the post 3 by links 6, so that the reciprocating motion of the shaft causes the posts 3 and therefore the screen 2, to move between the positions above described.

Preferably the wind screen 2 is constructed to relieve the wind pressure thereon to some extent. For example, openings 7 (Fig. 3) may be provided at intervals in the screen, with weighted flaps 8 on the inner side of the screen, or the screen may be made with very fine openings therein, since it is not necessary for most purposes that the passage of wind currents through the screen be entirely prevented.

The illustrated apparatus is also provided with a tiltable ramp 9 at the entrance end of the platform, and a safety screen 10 at the far end of the platform, which latter is pivoted at 11 and may be constructed similar to the screens 2 hereof so as to act as a wind screen as well, whereby by moving both of the parts to an upper position the space above the platform will be shielded all the way around against wind currents.

While a specific embodiment of the invention has been described, it will be obvious that many changes may be made therein without departing from its principles as set forth in the appended claim.

I claim:

In combination, an aerial platform wherein the interior upper surface of the platform serves as a runway for receiving aerial vehicles, a wind screen running along one or more of the borders of said runway, and means whereby said screen may be adjusted to one position in which it shields the space above said platform and to another position in which it leaves said space clear.

In testimony that I claim the foregoing, I have hereunto set my hand this 2d day of August, 1927.

RICHARD GIBBONS.